Figure 1:
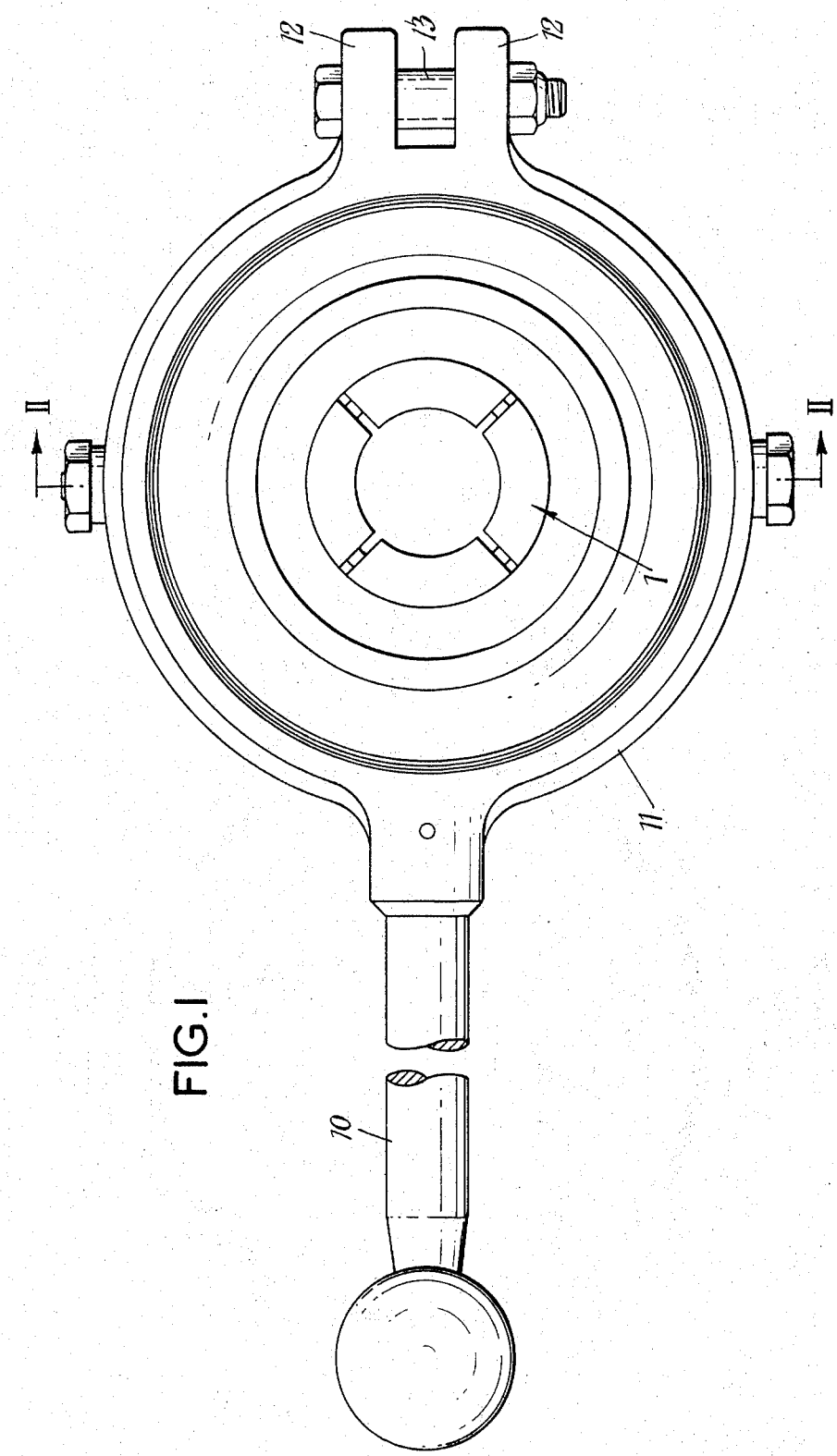

United States Patent [19]
Levy

[11] 3,802,713
[45] Apr. 9, 1974

[54] LEVER OPERATED COLLET CHUCK

[75] Inventor: Ronald Philip Levy, Winchester, England

[73] Assignee: F. Burnerd and Company Limited, Winchester, Hampshire, England

[22] Filed: Mar. 15, 1973

[21] Appl. No.: 341,578

[30] Foreign Application Priority Data
Mar. 22, 1972 Great Britain................... 13378/72

[52] U.S. Cl...................... 279/50, 279/74, 279/113
[51] Int. Cl............................................ B23b 31/30
[58] Field of Search............. 279/42, 43, 47, 48, 50, 279/74, 113

[56] References Cited
UNITED STATES PATENTS
3,292,939  12/1966  Lorenz............................... 279/50

Primary Examiner—Francis S. Husar
Attorney, Agent, or Firm—Bacon & Thomas

[57] ABSTRACT

A lever operated collet chuck with a collet having screw-threads on the rear external surface thereof, and slots at the front to permit opening and closing about the work, a collet closing sleeve moved by a plurality of thrust balls housed in the chuck body and moved radially inwardly by a lever operated actuating sleeve; and a geared ring in screw-threaded engagement with the collet, a pinion turned by a key being employed for rotating the ring to adjust the collet axially into initial engagement with the work.

3 Claims, 2 Drawing Figures

LEVER OPERATED COLLET CHUCK

This invention relates to a lever operated collet chuck.

There is a need for a simple design of chuck which will receive a collet of the "draw back" type which is formed in one piece with axially extending slots therein which permit a limited degree of opening and closing of the collet in the neighbourhood of the slots. Such collets are well known and are in general use and it is the main object of this invention to provide a simple construction of chuck utilising such collets.

According to the present invention there is provided a lever operated collet chuck for the reception of a collet having screw-threads on the external surface thereof, including a chuck body, a collet closing sleeve within the chuck body, a lever operated actuating sleeve surrounding the chuck body, a plurality of thrust members constrained by the chuck body for radial movement with respect thereto, said thrust members engaging inclined surfaces on the collet closing sleeve and actuating sleeve so that axial movement of the actuating sleeve in one direction causes, through the thrust members, axial movement of the collet closing sleeve to close the collet and axial movement of the actuating sleeve in the other direction enables opening of the collet, a geared ring adapted for screw-threaded engagement with the screw-threads of the collet, and a pinion in mesh with the gear teeth of the ring, said pinion being adapted to be rotated by a key from external of the chuck to move the collet axially to close the collet into engagement with the work, final clamping of the work by the collet being effected through the lever operated actuating sleeve.

Figure 2:
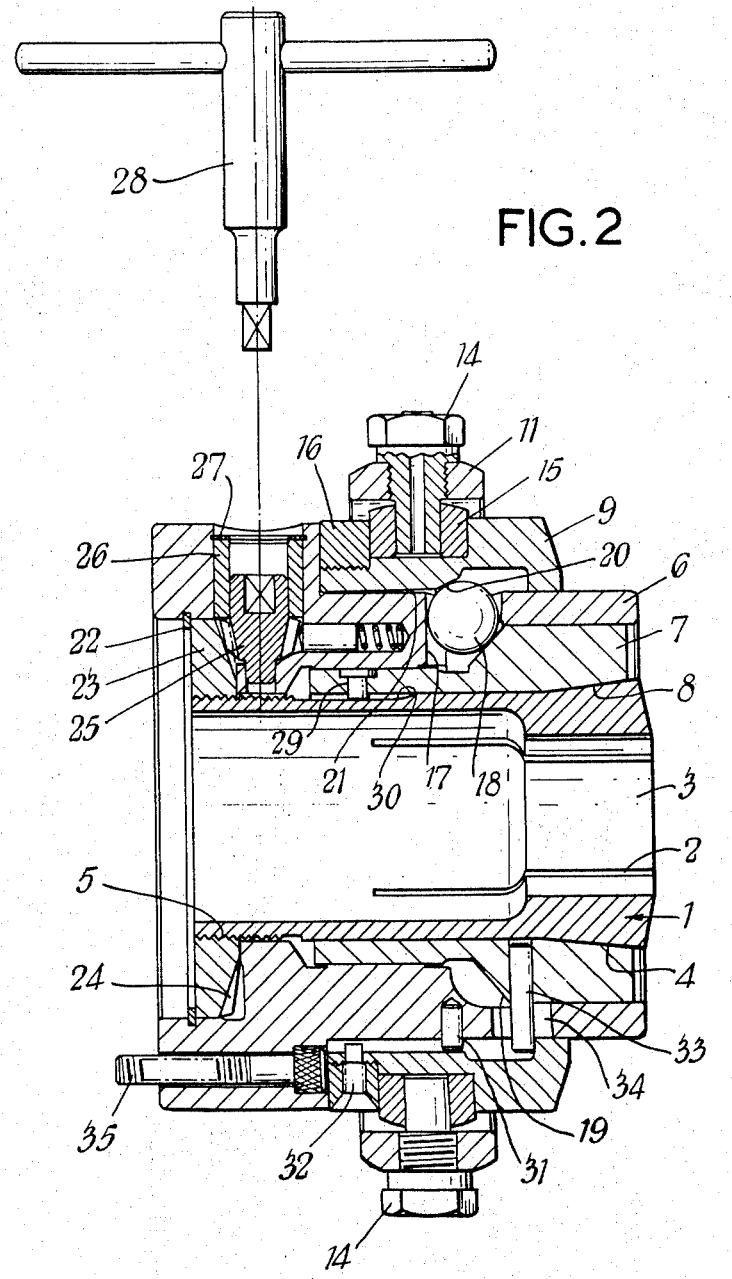

One embodiment of lever operated chuck constructed in accordance with the invention will now be described, by way of example only, and with reference to the accompanying drawings, in which:

FIG. 1 is an end view of the chuck; and
FIG. 2 is a sectional view on the line II — II of FIG. 1.

Referring to the drawing, a collet 1 is of the "draw back" type formed in one piece and has longitudinally extending slots 2 in the neighbourhood of the work gripping area 3 and a tapered external surface 4 for co-operation with a similarly tapered surface of the chuck which receives the collet. The collet 1 is also provided with screw-threads 5 on its external surface for co-operation with further screw-threads in the chuck. Such a construction of collet 1 is well known and is widely used.

The chuck includes a chuck body 6 slidingly housing within it a collet closing sleeve 7 having an internal taper 8 for co-operation with the taper 4 of the collet. Surrounding the body 6 is an actuating sleeve 9 capable of axial movement in relation to the body 6 by operation of lever 10 which is attached to operating yoke 11 pivoted by means of jaws 12 and bolt 13 to a fixed part of the machine on which the chuck is mounted. The operating yoke 11 is connected by screw-threaded studs 14 to a thrust ring 15 which is held on actuating sleeve 9 by the screw-threaded lock ring 16 being screwed on to actuating sleeve 9.

Located within radial apertures 17 in chuck body 6 are a plurality of thrust members, in this embodiment balls 18, although other types of thrust members may be employed. These balls 18 engage an inclined surface 19 on the collet closing sleeve 7 and two axially continuous inclined surfaces 20 and 21 on the actuating sleeve 9. These two inclined surfaces 20 and 21 have different angles of inclination, the inclination of surface 21 being very small to render the chuck self-locking.

Retained within the body 6 by a spring retaining ring 22 is a geared ring 23 in screw-threaded engagement with the screw-threads 5 of the collet 1. Teeth 24 of this ring 23 are in engagement with pinion 25 held in position by a bush 26 retained by a spring retaining ring 27. The pinion 25 is adapted to receive a key 28 for manual adjustment of the collet 1 from external of the chuck.

Rotation of the collet 1 within the chuck is prevented by a pin 29 carried by the collet closing sleeve 7 engaging in a keyway 30 in the collet 1. The forward movement of actuating sleeve 9 to close the collet is limited by a stop 31 carried by the body 6 being engaged by a stop 32 carried by the lock ring 16. The closing sleeve 7 carries a pin 33 which passes through an aperture 34 in the body 6 and is engaged by the actuating sleeve 9 when this is returned for releasing the collet 1 thereby positively withdrawing the closing sleeve 7 and permitting the collet 1 to release the work. Screws 35 are provided for fixing the chuck to an appropriate part of a machine.

In operation and with the work positioned within the collet, the collet is first adjusted axially by rotation of key 28 to rotate pinion 25 and hence geared ring 23. This, in turn, will move collet 1 axially and if the collet 1 is moved to the left as viewed in FIG. 2, the internal taper 8 on closing sleeve 7 will co-operate with external taper 4 on collet 1 and close collet 1 about the work. This forms the first part of the operation in clamping the work. The final part of the clamping operation is achieved by movement of lever 10 forcing thrust ring 15 to the right as seen in FIG. 2. This causes the actuating sleeve 9 also to move to the right as seen in FIG. 2. The inclined surface 20 now bears on balls 18 imparting a radially inward force so that the balls impart an axial force to closing sleeve 7 closing the collet 1 about the work. The balls finally ride on to inclined surface 21 thus rendering the collet self-locking.

Release of the work is achieved by reverse movement of lever 10.

I claim:
1. A lever operated collet chuck adapted for the reception of a collet having screw-threads on the external surface thereof, including
   a chuck body,
   a collet closing sleeve within the said chuck body,
   a lever operated actuating sleeve surrounding the said chuck body,
   a plurality of thrust members constrained by the chuck body for radial movement with respect thereto, said thrust members engaging inclined surfaces on the said collet closing sleeve and the said actuating sleeve so that axial movement of the said actuating sleeve in one direction causes, through the said thrust members, axial movement of the said collet closing sleeve to close the said collet and axial movement of the said actuating sleeve in the other direction enables opening of the said collet, a geared ring adapted for screw-threaded engagement with the screw-threads of the said collet, and a pinion in mesh with the said gear teeth of the said ring, said pinion being adapted to be rotated by a key from external of the said chuck to move the said collet axially to close the collet into engagement of the work, final clamping of the work by the collet being effected through the said lever operated actuating sleeve.

2. A lever operated collet chuck according to claim 1, including
a bush retained in position by a spring retaining ring to hold the said pinion in position.

3. A lever operated collet chuck according to claim 1, including
a collet with screw-threads on the external surface thereof in engagement with the said geared ring.

* * * * *